(12) United States Patent
Keller et al.

(10) Patent No.: US 7,803,729 B2
(45) Date of Patent: Sep. 28, 2010

(54) INSULATING ELEMENT FROM MINERAL FIBERS FOR SHIPBUILDING

(75) Inventors: Horst Keller, Wilhelmsfeld (DE); Ina Bruer, Schifferstadt (DE); Gerald Amannt, Senlis (FR); Jean-Luc Bernard, Glencourt Breuil le Vert (FR)

(73) Assignee: Saint-Gobain Isover (FR)

( * ) Notice: Subject to any disclaimer, the term of this patent is extended or adjusted under 35 U.S.C. 154(b) by 449 days.

(21) Appl. No.: 10/575,018

(22) PCT Filed: Oct. 4, 2004

(86) PCT No.: PCT/EP2004/011061

§ 371 (c)(1),
(2), (4) Date: May 4, 2007

(87) PCT Pub. No.: WO2005/035895

PCT Pub. Date: Apr. 21, 2005

(65) Prior Publication Data

US 2008/0014422 A1    Jan. 17, 2008

(30) Foreign Application Priority Data

Oct. 6, 2003   (EP) .................................. 03022610
Jan. 7, 2004   (FR) .................................. 04 00084

(51) Int. Cl.
*D04H 3/00*   (2006.01)
*D04H 3/12*   (2006.01)
*C03C 13/00*  (2006.01)
*C03C 13/06*  (2006.01)

(52) U.S. Cl. ...................... 442/340; 442/378; 442/414; 442/417; 442/57; 442/35; 428/212; 428/218; 428/219; 501/35; 501/36

(58) Field of Classification Search ............. 501/35–38; 442/340, 378, 414, 57, 35, 417; 428/212, 428/218, 219

See application file for complete search history.

(56) References Cited

U.S. PATENT DOCUMENTS 4,467,005 A    8/1984   Pusch et al.

(Continued)

FOREIGN PATENT DOCUMENTS

CH    659755    2/1987

(Continued)

OTHER PUBLICATIONS

Balcerowiak et al. "Thermal Stability of Binder For Mineral Wool Insulations". Journal of Thermal Analysis, vol. 43 (1995) 299-303.*

(Continued)

*Primary Examiner*—Patricia L. Nordmeyer
*Assistant Examiner*—Prashant J Khatri
(74) *Attorney, Agent, or Firm*—Sheridan Ross P.C.

(57) ABSTRACT

Insulating element from mineral fibers for shipbuilding with an insulating element in form of a plate or roll felt for shipbuilding the composition of the mineral fibers of the insulating element points an alkali/alkaline-earth mass ratio of the fiber structure of the insulating element is determined by an average geometrical fiber diameter of $\leq 4$ µm and a surface weight of 0.8 through 4.3 kg/m$^2$ and a binding agent portion above 0.5 until 4 weight %.

11 Claims, 3 Drawing Sheets

U.S. PATENT DOCUMENTS

Figure 1:
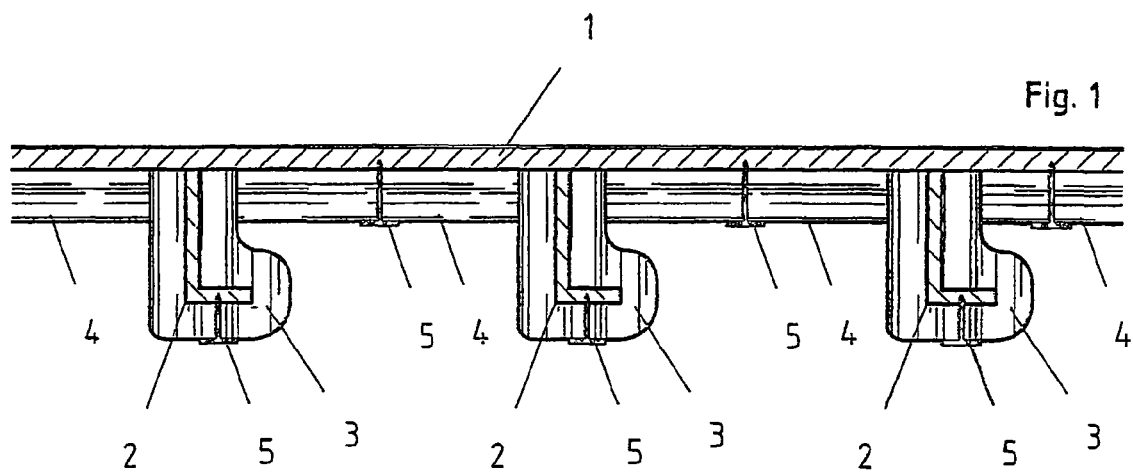

| | | | | |
|---|---|---|---|---|
| 4,928,898 | A | * | 5/1990 | Audren et al. ............ 242/535.1 |
| 5,243,126 | A | | 9/1993 | Chow et al. |
| 5,346,868 | A | | 9/1994 | Eschner |
| 5,554,324 | A | | 9/1996 | Bernard et al. |
| 5,601,628 | A | | 2/1997 | Battigelli et al. |
| 5,614,449 | A | | 3/1997 | Jensen |
| 5,900,298 | A | | 5/1999 | Syme et al. |
| 5,962,354 | A | | 10/1999 | Fyles et al. |
| 6,074,967 | A | | 6/2000 | Erskine |
| 6,158,249 | A | | 12/2000 | Battigelli et al. |
| 6,284,684 | B1 | | 9/2001 | Vignesoult et al. |
| 6,358,872 | B1 | | 3/2002 | Karppinen et al. |
| 6,512,173 | B1 | | 1/2003 | Muth |
| 6,797,356 | B2 | | 9/2004 | Zupon et al. |
| 2002/0168521 | A1 | | 11/2002 | Baracchini et al. |
| 2004/0258865 | A1 | * | 12/2004 | Jessen et al. ................ 428/35.7 |
| 2007/0093155 | A1 | | 4/2007 | Bihy et al. |
| 2007/0184740 | A1 | | 8/2007 | Keller et al. |
| 2008/0196638 | A1 | | 8/2008 | Keller et al. |

FOREIGN PATENT DOCUMENTS

| | | | |
|---|---|---|---|
| DE | 3612857 | | 9/1986 |
| DE | 19604238 | | 8/1997 |
| DE | 29711054 | | 2/1998 |
| DE | 19747622 | | 4/1999 |
| DE | 19942882 | | 6/2001 |
| DE | 10256434 | | 6/2003 |
| EP | 0123965 | | 11/1984 |
| EP | 0399320 | | 11/1990 |
| EP | 0525816 | | 2/1993 |
| EP | 0551476 | | 7/1993 |
| EP | 0583791 | | 2/1994 |
| EP | 0583792 | | 2/1994 |
| EP | 0741003 | | 11/1996 |
| EP | 0821755 | | 2/1998 |
| EP | 1097807 | | 5/2001 |
| EP | 1157974 | | 11/2001 |
| EP | 1182177 | | 2/2002 |
| EP | 1296002 | | 3/2003 |
| WO | WO-89/12032 | | 12/1989 |
| WO | WO 89/12032 | | 12/1989 |
| WO | WO 94/04468 | | 3/1994 |
| WO | WO-95/32925 | | 12/1995 |
| WO | WO00/17121 | * | 3/2000 |
| WO | WO 00/17121 A1 | * | 3/2000 |
| WO | WO0270417 | * | 2/2002 |
| WO | WO 03/047850 | | 6/2003 |

OTHER PUBLICATIONS

Written Opinion (including translation) for International (PCT) Patent Application No. PCT/EP2004/011061.
International Preliminary Report on Patentability (including translation) for International (PCT) Patent Application No. PCT/EP2004/011061.
International Search Report for International (PCT) Patent Application No. PCT/EP2004/011063.
Written Opinion (including translation) for International (PCT) Patent Application No. PCT/EP2004/011063.
International Preliminary Report on Patentability (including translation) for International (PCT) Patent Application No. PCT/EP2004/011063.
International Search Report for International (PCT) Patent Application No. PCT/EP2004/011062.
Written Opinion (including translation) for International (PCT) Patent Application No. PCT/EP2004/011062.
International Preliminary Report on Patentability (including translation) for International (PCT) Patent Application No. PCT/EP2004/011062.
International Search Report for International (PCT) Patent Application No. PCT/EP2004/011781.
Written Opinion for International (PCT) Patent Application No. PCT/EP2004/011781.
International Preliminary Report on Patentability for International (PCT) Patent Application No. PCT/EP2004/011781.
Official Action for U.S. Appl. No. 10/575,009, mailed Jun. 25, 2008.
Official Action for U.S. Appl. No. 10/575,009, mailed Feb. 6, 2009.
Official Action for U.S. Appl. No. 10/576,902, mailed Dec. 12, 2008.
Official Action for U.S. Appl. No. 10/575,009, mailed Oct. 6, 2009.

* cited by examiner

| Conventional rock wool | |
|---|---|
| Maximum: | 17,4 μm |
| D 50 | 4,7 μm |
| Arithmetic means | 5,3 μm |
| Standard deviation | 3,2 μm |
| Geometric means | 4,4 μm |

| Conventional glass wool | |
|---|---|
| Maximum: | 19,4 μm |
| D 50 | 2,8 μm |
| Arithmetic means | 4,6 μm |
| Standard deviation | 3,6 μm |
| Geometric means | 2,9 μm |

| Mineral wool according to invention | |
|---|---|
| Maximum: | 20,5 μm |
| D 50 | 3,2 μm |
| Arithmetic means | 4,1 μm |
| Standard deviation | 3,0 μm |
| Geometric means | 3,2 μm |

INSULATING ELEMENT FROM MINERAL FIBERS FOR SHIPBUILDING

FIELD

The invention concerns an insulating element of mineral fibers for shipbuilding, in particular in form of a plate or roll felt, in accordance with the characteristics of the preamble of patent claim 1.

In shipbuilding, fire protection plays a substantial role with the lining of walls and covers with insulating elements, mainly in publicly accessible ways and areas, whilst this does not apply with the thermal protection. Since for thermal protection in shipbuilding, usually no regulations exist, the shipowner can meet those thermal protection measures, which he considers adequate. Due to the small gross weight, for the thermal protection primarily fiber glass is used as heat insulating-material, for example with gross densities scarcely over 20 $kg/m^3$ and an λ-arithmetic procedure of 35 mW/mK according to the heat guidance group WLG 035, pursuant to DIN 18165 in the above ground construction.

In particular for passenger liners, however, world-wide standards are prescribed by the International Maritime Organization (IMO), concerning fire protection. These extend all the way from Fire Resistance Category A15 for cab partitions up to Fire Resistance Category A60 for escape routes, engine room, kitchen and such and similar areas, and the Fire Resistance Category A30 may be planned for other zones of the passenger liner. As also determined in other areas of utilization, the Fire Resistance Category of a fire-protection structure is being determined by the fact that a closed room, exposed to the fire test, is exposed to an accordingly high temperature and the length of time up to reaching a prescribed limit temperature is being measured in a neighboring room, separated from the fire-protection structure. The Fire Resistance Category indicates this period of time as a minimum time in minutes.

It is appropriate to refer as relevant parameter for the determination of the suitable damming materials in shipbuilding, where the insulating material thickness are very different, to refer to the weight per unit area, since this parameter embodies the two substantial measured influence variables, i.e. gross density and thickness.

For such fire-protection structures with the Fire Resistance Category A30 or above, so far mainly rock wool was being used as insulation material, due to its temperature resistance index. Such rock wool is usually produced with nozzle blow molding or with external centrifugation, for example the cascade centrifugation process. Relatively rough fibers are formed in the process, with an average geometric diameter above 4 to 12 μm with relatively short length. Based on the production, also a considerable portion of unfiberized material in form of coarser fiber components results, being present in the product in the form of so-called "beads", with a portion of 10-% to 30%, participating of the weight, but not of the insulation effect and, therefore, fire protecting effect.

Compared to felts, mats or fiber glass plates, the advantage of a fire-protection structure with rock wool is represented by the better fire protection behavior, and therefore this latter construction is being exclusively utilized in cases of higher Fire Resistance Categories. The stone wool material becomes either as quilted wire net mat with an bonding agent content of approximately 0.7 weight % (dry related to the fiber mass) with a gross density of approximately 90 $kg/m^3$ or as firm plate with an bonding agent content of approximately 0.5 to 2 weight % and a gross density from 80 to 150 $kg/m^3$. In the case of plates the high bonding agent content, in case of a high gross density, leads to a high absolute admission of bonding agent. Since as bonding agent an organic material is usually used, such as phenol formaldehyde resin, a not insignificant increase of fire load results, which in the fire test can lead to a flame projection on the "cold" side of the fire-protection structure, results, which is a failure criterion. Quilted wire net mats again are not everywhere applicable.

Especially, the use of conventional rock wool is not in consonance with substantial other shipbuilding requirements:

A central requirement in shipbuilding is the weight minimization, since each additional weight leads to an increase of the traction resistance and, thus, the fuel consumption. The high gross density of usual rock wool products in each case over 80 $kg/m^3$ leads to an unwanted weight increase, due to the high volume of insulation material for the lining of walls and covers, particularly in passenger liners.

In second place of the requirements is economy of space. Inside the ship hull with predetermined external dimensions, the usable surface decreases with each enlargement of the wall thickness. Due to its relative short and thick fibers, however, conventional rock wool features a comparatively small heat-insulating property vis-à-vis conventional fiber glass, so that a larger wall thickness results, in order to attain an identical heat insulation effect. This heat insulation efficiency is, however, one of the conditions for the fire resistance capacity.

In addition, extremely cramped space conditions prevail in a shipyard for the craftsmen. For this reason each trade may bring only such material aboard the vessel which will effectively used by a team of craftsmen and at the end of the end of the operations of said team, material not used must again be removed from vessel. It should thus be insured that eventually insulation material of the damming technician does not eventually affect excessively the work of electricians. Since it must be avoided, in any case, that close to the end of the team work, there is a lack of material, it is always necessary to work with excess material, which initially has to be transported over closes bars and stairs until the place of operation in the vessel, with material having to be returned at the end of the work of the respective team. In this case, high weight and large volume of materials are extremely negative. In this case, it is especially disadvantageous that a compression of the rock wool material is nearly impossible, since it only features a reduced resilience rate. If the rock wool material would be compressed at a stronger rate in view of economy of space, then the danger would arise that the required thickness for assembly would no longer be attained with the subsequent opening of the package.

An additional problem lies in the multiplicity of the used fire protection and heat insulating materials for the different fire resistance categories, respectively for the heat insulations to be integrated. Thus, for each type of material, the corresponding logistic measure has to be taken, and in the event a given type of material should be lacking, normally it is not possible to continue the work with another type of insulating material. This results in considerable logistic problems, especially when the work is taking place in conditions of reduced time frames.

Another problem with vessels is the over head assembly in areas featuring reduced space. This is especially difficult with heavy materials and in the event of using quilted wire net mats, it is affected due to the fact that said material does not feature rigidity and may be in a pending position from retained points. In addition, "beads" falling down from the material during its assembly, in the form of material not fiberized, could negatively affect the work. Also, as a result of the rock wool surface with relatively short and brittle fibers, the haptic index is unsatisfactory, since during assembly, the material does not always feature a pleasant touch.

An important problem during the operation of a vessel are also vibrations. These are present while the engine is operating. Since vibrations of the most different frequencies are also being transferred to the rock wool material, where they cause oscillations of the relatively thick and heavy fibers, as well as the "beads", provided in an intermediate position, there is also a trend that the connections, caused by the binding agent, may become lose at the crossing sections of the fibers. Especially in the case of vertical fire protection constructions, this may result in depositions of material, with the consequence that the fire protection effect in the upper portion of the construction may be unduly reduced. In the case of horizontal cover constructions, ruptured fiber material may accumulate jointly with "beads" in the lower area of the insulation, and may, in a certain way, be "discharged", thus affecting subsequent disassembly in view of the large powder rate, which may require additional protective measures for the work.

It is an object of the present invention to provide for naval construction, an insulating element in the form of a plate or roll felt, which eliminates the disadvantages of such insulating elements based on traditional rock wool and offers comparatively reduced weight, and the insulating elements should especially have their weight reduced at least at the basis of 25%, without negatively affecting the requirements relative to fire and operational safety. In addition, said insulating elements should feature such a nature that they improve the vessel's small logistic.

According to the invention, this task is being solved by the characteristic features, contained in claim 1, and preferred embodiments of the invention are marked by the characteristics, contained in the dependent claims.

The invention is characterized by synergistic cooperation of several factors. On one hand, mineral fibers are used; whose alkali/alkaline-earth mass ratio is equivalent to <1. Consequently, the mineral fiber stands out due to a high temperature resistance factor, especially as compared to fibers with an alkaline/earth alkaline mass relation of >1. At the same time, the mineral fiber structure is of a fine natures that the fibers feature an average geometrical diameter of $\leq 4\mu$ and the surface weight of the insulating elements is placed between 0.8 and 4.3 kg/m². The portion of bonding agent, referred to the fiber mass of the insulating element, is restricted for this fine fiber structure to the range above 0.5 until 4 weight %. With this configuration, corresponding weight advantages result, as compared to insulating elements of traditional rock wool. In connection with the finely finished fibrous structure, this results in that individual insulating elements may be compressed at a higher rate, since the mineral fiber, according to the invention, features a larger resetting ability. This, on its turn, implies in advantages of space and, therefore, logistic advantages, since the volume to be transported inside the vessel for the craftsman will be smaller. The mineral wool material is free of beads, i.e. the content of the beads is <1%. This is of advantage because the result is a very homogenous formation of the fine fiber structure and therefore uniform insulation values are attained over the whole surface of the insulating element. As a consequence of the finer fiber structure, with considerably reduced gross density, one attains, at the same time, the identical λ-arithmetical factor as occurs with traditional rock wool, with considerably higher gross density. Since, at the same time, with identical percentage content of binding agent, a considerably reduced absolute amount of binding agent is being integrated into the fire protection construction, thus being considerably reduced the fire load factor, corresponding advantages result in regards to the considerable fire protection criteria according to IMO, especially demanded for passenger liners. On an overall basis, thickness of insulating agent and, consequently, wall thickness of the fire protection construction may be saved for a given fire protection resistance category. This renders easier the assembly of the insulating elements, one side as a result of the reduced weight and, on the other side, as a result of the lower thickness of the insulating elements. Elements to be manipulated are not heavy and besides this, they exhibit—with same relative bonding agent quantity as with conventional stone wool materials—a higher rigidity against bending under dead weight. Also this is again due to the finer fiber structure, as compared to conventional rock wool, which is configured in a similar fashion to a glass wool structure, which results in that, with identical gross density as with traditional rock wool fibers, an essentially larger number of fibers is present in the structure and, consequently, also a large number of crossing points for the fiber connections. With identical binding agent application as with rock wool, in view of the large number of crossing points and concentration of binding agent at these points, there is a reduction of the portion of binding agent which does not contribute towards the binding action, thus resulting a fiber connection, resulting to a comparatively more rigid configuration of the hardened mineral fiber plate. In other words: The insulating element, according to the invention, is highlighted by an improved utilization of binding agent.

The average reduced diameter responsible for the fiber fineness is determined from the frequency distribution of the fiber diameter. The frequency distribution may be determined, based on a wool sample with a microscope. The diameter of a larger number of fibers is being measured and applied, resulting in an oblique distribution towards the left side (see FIGS. 4, 5 and 6).

As a consequence of the high elasticity of the slim, long fibers, there also results an outstanding repercussion condition under compression. Therefore, the products may be brought aboard in a highly compressed state and may there be used and offer elasticity when package is being opened for assembly at the nominal thickness. This is highly important as a result of the cramped space, prevailing on a vessel.

The mineral wool material, configured according to the invention, fulfills both the requirements as to fire protection, as well as for thermal protection. As a consequence, this material may adequately replace also glass wool, used for certain purposes in naval construction. Consequently, there will be a reduction of multiplicity of types and especially a danger of erroneous substitution with glass wool products may be excluded.

In the context of the invention, advantageously an organic binding agent is used as binding means, especially phenol-formaldehyde resin or melamine resin or similar products. These binding elements are highlighted by a satisfactory binding effect, as a result the fine fiber structure according to the invention and consequently also contribute towards better rigidity of the insulating element.

It is especially convenient in this regard when the portion of binding element, relative to the fiber mass of said insulating element, is within the range of 0.5 until 3 weight %, especially 0.5 until 2 weight %. Particularly it is preferred that the content of binding agent for insulating elements of the fire resistance category A15 is in the range of 2.5 to 4%, for A 30 in the range of 2 to 3.5% and for A 60 in the range of 1 to 3%.

As regards an assembly of the insulating elements on the vessel's deck, according to practically procedures, it will be convenient to configure the surface weight at a fire resistance category A15 or similar of 0.8 to 1.4 kg/m², preferentially 1.2 kg/m² with a fire resistance category A30 or similar of 1.2 to 1.8 kg/m², preferably 1.6 kg/m² and with a fire resistance category A60 or similar, 2.0 to 2.5 kg/m², preferably 2.3 kg/m³.

As regards an assembly of the insulating elements on the vessel's bulkhead, according to practical procedures, it will be convenient to configure the surface weight at a fire resistance category A15 or similar of 0.8 to 1.4 kg/m², preferentially 1.2 kg/m² with a fire resistance category A30 or similar of 1.2 to 1.8 kg/m², preferably 1.6 kg/m² and with a fire resistance category A60 or similar, 2.0 to 2.5 kg/m², preferably 2.3 kg/m³. As far as reference is made to standards and examination requirements, it is referred to the current version as filed on the filing date.

According to the invention, it is possible that the insulating element for the transportation may be compressed with a compressing relation at least in the relation of 1:2 until an upper gross density of 50 kg/m³, and especially until an upper gross density of 30 kg/m³ at least in a relation of 1:3, which is of great advantage during the construction of the vessel for the logistic, relative to transportation issues of such insulating materials.

In this case, the insulating element may be present in the form of a sheet of insulating material, which, under compression, is wound in the form of a roll felt, or also it may feature the form of a plate, where, as a consequence of the fine fiber structure and the high binding agent utilization rate, the plate is comparatively rigid. Also the roll felt with a gross density in the range of 20 to 30 kg/m³, in the opened condition, features a plate character similar to a so-called "clamping felt", so that from the opened roll felt, according to measurement requirements, respective plates may be cut off. In another embodiment of the roll felt, in the form of a quilted wire net mat, it is advantageous that this unit features a temperature of utilization of >500° C. with gross densities between 45 and 75 kg/m³³, especially between 55 and 65 kg/m³ with a binding agent content of <2 weight %, especially between 0.5 and 1.5 weight %.

Conveniently, the mineral fibers of the insulating element are produced by means of internal centrifugation in the centrifuging basket procedure, with a temperature at the centrifuging basket of at least 1.100° C. The production of mineral fibers with a comparatively high temperature resistance pursuant to the internal centrifugation is already known and expressly reference is being made to EP 0,551,476, EP 0,583, 792, where 94/04468 as well as U.S. Pat. No. 6,284,684. In the context of the invention, additionally there are especially foreseen mineral fibers, who melting point according to DIN 4102 Part 17, is above 1.000° C.

The mineral fibers, produced by internal centrifugation, are finer and longer than traditional rock wool material, which is produced with the nozzle blowing process or with external centrifugation. Therefore the finer and longer fibers are more elastic than the relatively brittle fibers of traditional rock wool. In the case of oscillations of fibers due to vibrations, considerably lower forces are being transferred between crossing points by the binding agent, so that the connection of the fibers at their crossing points is preserved in a stable manner by the binding agent, also in the case of vibrations. Additionally, such mineral wool material, produced by internal centrifugation, is practically exempt of beads, so that also the beads may not act as additional oscillating mass on the binding connection at the crossing points. In addition, the specific frequency of the slim and lighter fibers is at such a high level that eventually excessive oscillations in the ship's vibration may enter into a resonance relationship, featuring, nevertheless, considerably lower energy rates.

In the context of the invention, it is convenient that the insulating element is configured as molded section for the surpassing insulation of ship's frames, which, again, is advantageous for the assembly. In this context, it is convenient that the molded section offers a lamination, such as an aluminum foil or glass cloth fleece, being thus applied at the frames and it involves theses units in one step, exempt of a thermal bridge effect.

The insulating elements i.e. molded sections, are formed from mineral fibers, soluble in a physiological agent, and these elements correspond to the requirements of the European guideline 97/69/EG and/or to the requirements of the German norm of dangerous products, section IV, no. 22, which insured guarantees in the areas of health of the fire resistance installations at the production, processing, utilization and elimination.

Subsequently, Table 1 features the preferred composition of the mineral fibers of an insulating element, i.e. molded section according to the invention, with indication made per areas in weight % figures.

TABLE 1

| | | | |
|---|---|---|---|
| $SiO_2$ | 39-55% | preferably | 39-52% |
| $Al_2O_3$ | 16-27% | preferably | 16-26% |
| CaO | 6-20% | preferably | 8-18% |
| MgO | 1-5% | preferably | 1-4.9% |
| $Na_2O$ | 0-15% | preferably | 2-12% |
| $K_2O$ | 0-15% | preferably | 2-12% |
| $R_2O$ ($Na_2O + K_2O$) | 10-14.7% | preferably | 10-13.5% |
| $P_2O_5$ | 0-3% | especially | 0-2% |
| $Fe_2O_3$ (Iron, total) | 1.5-15% | especially | 3.2-8% |
| $B_2O_3$ | 0-2% | preferably | 0-1% |
| $TiO_2$ | 0-2% | preferably | 0.4-1% |
| Other | 0-2.0% | | |

A preferred smaller range of $SiO_2$ is 39-44%, particularly 40-43%. A preferred smaller range for CaO is 9.5-20%, particularly 10-18%.

The composition according to the invention relies on the combination of a high $Al_2O_3$-content, of between 16 and 27%, preferably greater than 17% and/or preferably less than 25%, for a sum of the network-forming elements—$SiO_2$ and $Al_2O_3$—of between 57 and 75%, preferably greater than 60% and/or preferably less than 72%, with a quantity of alkali metal (sodium and potassium) oxides ($R_2O$) that is relatively high but limited to between 10-14.7%, preferably 10 and 13.5%, with magnesia in an amount of at least 1%.

These compositions exhibit remarkably improved behaviour at very high temperature.

Preferably, $Al_2O_3$ is present in an amount of 17-25%, particularly 20-25%, in particular 21-24.5% and especially around 22-23 or 24% by weight.

Advantageously, good refractoriness may be obtained by adjusting the magnesia-content, especially to at least 1.5%, in particular 2% and preferably 2-5% and particularly preferably ≧2.5% or 3%. A high magnesia-content has a positive effect which opposes the lowering of viscosity and therefore prevents the material from sintering.

In case $Al_2O_3$ is present in an amount of at least 22% by weight, the amount of magnesia is preferably at least 1%, advantageously around 1-4%, preferably 1-2% and in particular 1.2-1.6%. The content of $Al_2O_3$ is preferably limited to 25% in order to preserve a sufficiently low liquidus temperature. When the content of $Al_2O_3$ is present in a lower amount of for example around 17-22%, the amount of magnesia is preferably at least 2%, especially around 2-5%.

Figure 2:
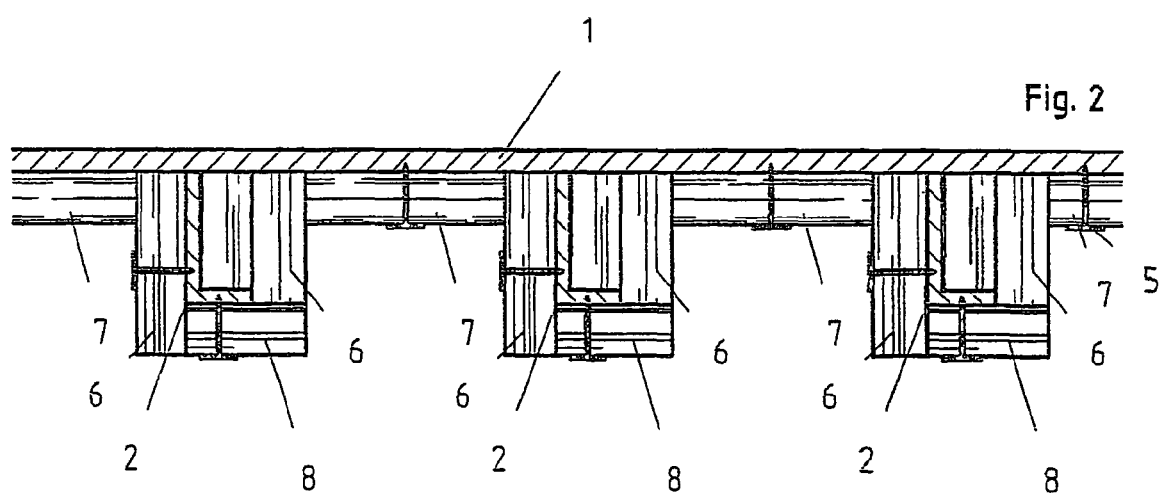
Figure 3:
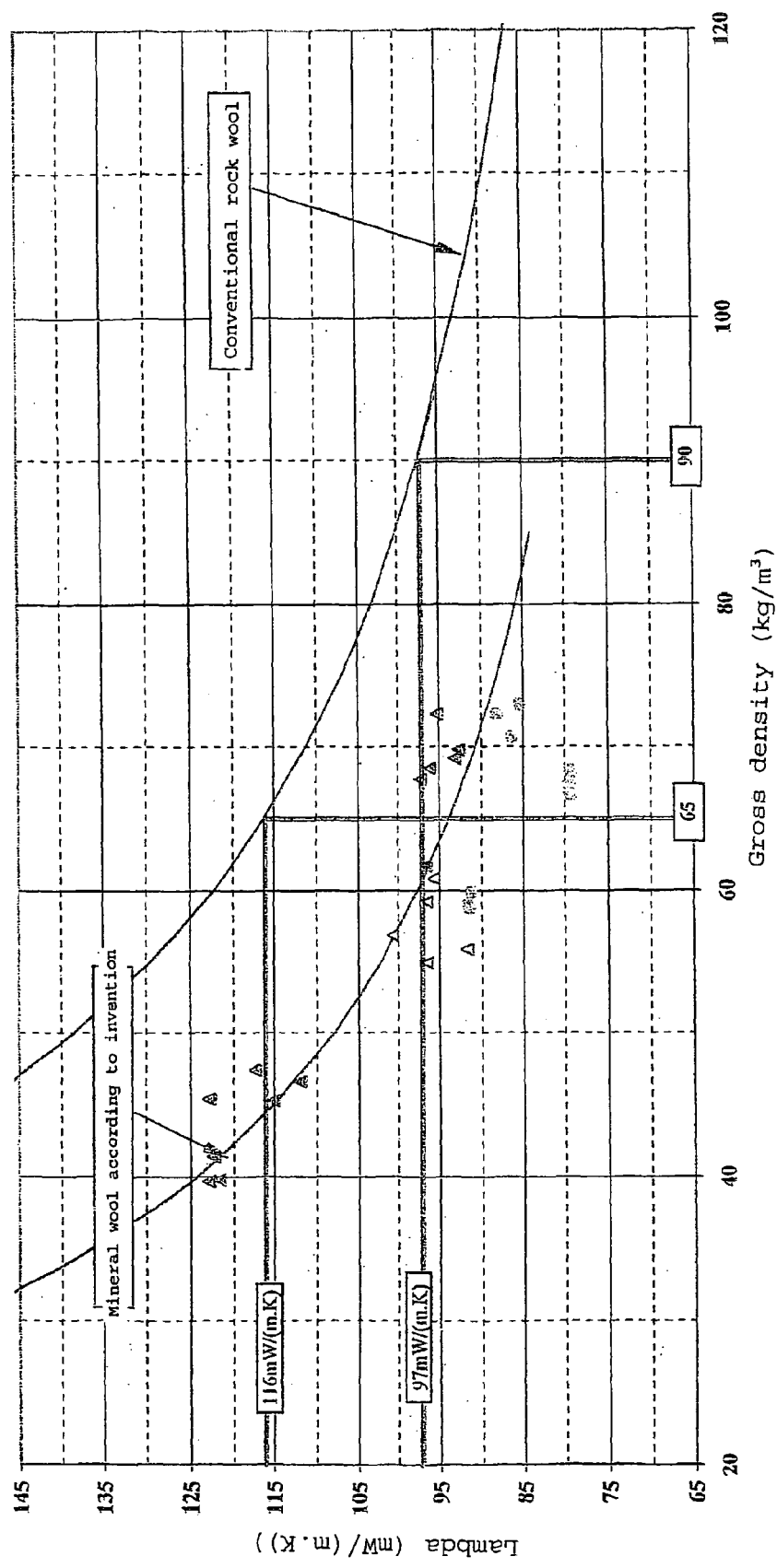
Figure 4:
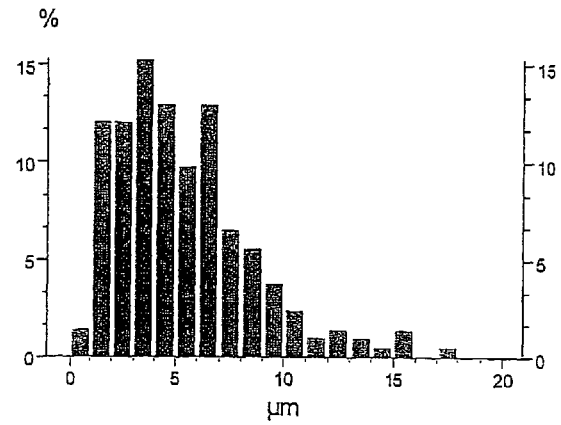
Figure 5:
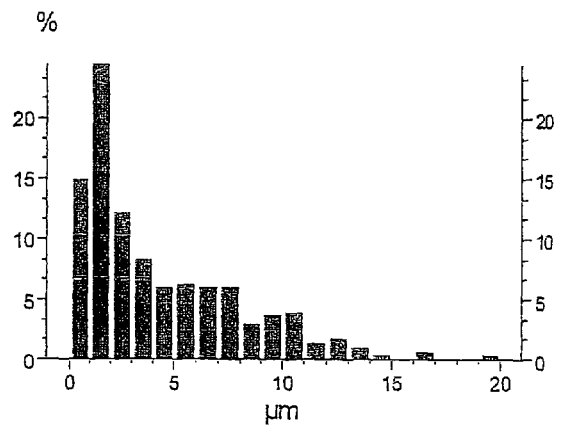
Figure 6:
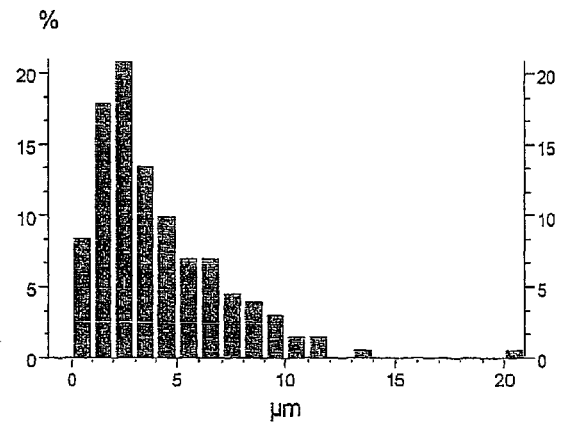

Subsequently, embodiments of the invention will be described, based on the drawings. The figures show:

FIG. 1 schematically simplifies a fire-protection structure at a ship deck using of roll felt, FIG. 2 in a representation, corresponding to FIG. 1, another execution form of the fire-protection structure using shaped parts, FIG. 3 a diagram of a comparison attempt in the context of a heat conductivity test at 400° C., FIG. 4 a typical fiber histogram of a conventional rock wool, FIG. 5 a typical fiber histogram of a conventional fiber glass, and FIG. 6 a typical fiber histogram of the mineral wool according to invention.

In FIGS. 1 and 2, the number 1 designates a vessel's deck, which, on its lower section, is reinforced with frames 2. The frames 2 feature commonly a L profile and are attached with their extended flank at the lower section of the ship's deck 1, by means of the welded seams, not shown, so that the best possible moment of resistance of the profile may be utilized for reinforcing said ship's deck 1.

A fire protection construction of such an area of the vessel consists, in principle, in that the lower section of the vessel's deck 1 is being protected in such a fashion against fire below the vessel's deck 1, that the high fire temperature in the area above vessel's deck 1 results to the threshold temperature rate only after a predetermined period of time. It is understood that the fire protection construction must also physically continue to exist, since otherwise an undesired thermal passage would result with a consequent temperature increase.

In the example of FIG. 1, frames 2 are covered with mineral wool felt 3, produced in the centrifugation basket process with internal centrifugation. For a fire resistance category A15, a very light roll felt material 3 will suffice with an surface weight of 1.2 kg/m$^3$, as an example, which was supplied as a roll with a compression ration of 1:3.5. The area between frames 2 is also covered by mineral wool material in the form of plates 4, produced by internal centrifugation. These units, in the exemplified case, also feature a surface weight of 1.2 kg/m$^2$. Both the felts 3, as well as the plates 4, are attached with adequate metal clips, as shown at 5 in FIGS. 1 and 2.

With the embodiment according to FIG. 2, the same cover construction is covered with plate-like mineral wool material, which was also produced by internal centrifugation. In this case, the frames 2 are insulated in the form represented, however by means of correspondingly cut plate sections 6 and 8, i.e. they are involved in a box-like fashion. In the intermediate area, intermediate plates 7 are introduced, and all elements are attached to the cover construction with adequate metal clips 5. The plate sections 6 through 8 may preferably be formed also as integral molded section, which is applied around the frames in such a way that in one operational step it embraces the frames without forming thermal bridges.

The plate material for plate sections 6, 7 and 8 features, in the example, a surface weight of 2.3 kg/m$^2$. With such a fire protecting construction, it is possible to attain the fire resistance category A60 without problems.

The material resistance in the event of fire is insured due to the fact that the mineral wool fibers are selected in such a way, that their point of fusion is located above 1.000° C. This will insure that also with fire resistance category A60, the insulating element of the invention is resistant, for a sufficiently extended period of time, i.e. one hour, against the fire temperatures.

In the version shown, the average geometrical fiber diameter is 3.2 μm and the binding agent content is 1.8 weight %.

The composition in weight % of the conventional insulating elements, i.e. molded section, produced from traditional rock wool, as well as insulating elements i.e. molded section, produced from traditional glass wool, results from Table 2, and the traditional rock wool, as well as the insulating element i.e. molded section of the invention, feature a melting point of at least 1000° C. according to DIN 4102, Part 17.

TABLE 2

| Material | Conventional rock wool | Conventional glass wool | Insulating elements according to invention |
|---|---|---|---|
| $SiO_2$ | 57.2 | 65 | 41.2 |
| $Al_2O_3$ | 1.7 | 1.7 | 23.7 |
| $Fe_2O_3$ | 4.1 | 0.4 | 5.6 |
| $TiO_2$ | 0.3 | | 0.7 |
| CaO | 22.8 | 7.8 | 14.4 |
| MgO | 8.5 | 2.6 | 1.5 |
| $Na_2O$ | 4.6 | 16.4 | 5.4 |
| $K_2O$ | 0.8 | 0.6 | 5.2 |
| $B_2O_3$ | | 5 | |
| $P_2O_5$ | | 0.15 | 0.75 |
| MnO | | 0.3 | 0.6 |
| SrO | | | 0.5 |
| BaO | | | 0.34 |
| Total | 100 | 99.95 | 99.89 |

FIG. 3 features a measuring series of a heat conductivity test at 400° C. with the gross density in for of a diagram. The results of the measurements were determined according to DIN 52612-1 with a so called double-plate instrument.

It can be seen in a simple fashion from this diagram, which potential of economy is feasible, by utilizing the mineral wool of the invention, compared to conventional rock wool, the example featuring two gross densities of 65 and 90 kg/m$^3$. The same heat conductivity capacity of 116 mW/mK, which is being attained with traditional rock wool with a gross density of 65 kg/m$^3$, is being obtained with the mineral wool of the invention already with a gross density of approximately 45 kg/m$^3$, i.e. with a weight economy of approximately 31%.

In an analogue fashion, with a gross density of 90 kg/m$^3$ of conventional rock wool, a weight economy of approximately 33% is attained with the mineral wool of the present invention.

Finally, FIGS. 4 and 5 feature the conventional rock wool, mentioned in the description, as well as conventional glass wool, featuring a typical fiber histogram of the insulating elements, and FIG. 6 features a histogram of fibers of the insulating elements of the invention.

The following table shows comparable essays between on the one side insulation elements made of conventional rock wool and elements according to invention indicated with IM and that in regard of the different fire resistance categories A15, A30 and A60 as well as differentiated into bulkhead and deck. The results of the table show that despite considerably reduced surface weight and significant reduced gross density, which is especially essential for the use of insulation elements in shipbuilding, the examination requirements of the fire resistance categories A15, A30 and A60 have been fulfilled by the IM insulation elements.

TABLE

| Type | Material | Gross density [kg/m³] | Thickness [mm] | Surface weight [kg/m²] | Examination fire resistance category | Loss due burning [%] |
|---|---|---|---|---|---|---|
| A15 Bulk-head | rock wool IM | 45 22 | 50 60 | 2.25 1.32 | fulfilled fulfilled | 1.8 3 |
| A15 Deck | rock wool IM | 45 22 | 50 60 | 2.25 1.32 | fulfilled fulfilled | 1.8 3 |
| A30 Bulk-head | rock wool IM | 45 36 | 50 50 | 2.25 1.8 | fulfilled fulfilled | 1.8 3 |
| A30 Deck | rock wool IM | 45 36 | 50 50 | 2.25 1.8 | fulfilled fulfilled | 1.8 3 |
| A60 Bulk-head | rock wool IM | 100 70 | 60 60 | 6 4.2 | fulfilled fulfilled | 1.5 2.5 |
| A60 Deck | rock wool IM | 100 48 | 40 50 | 4 2.4 | fulfilled fulfilled | 1.5 2.5 |

The invention claimed is:

1. An insulating element in the form of a plate or roll felt, adapted for the insulation of a vessel's deck, comprising mineral fibers, made of bonded fibers soluble in a physiological agent, wherein the insulating element may be utilized as fire and/or thermal and/or sound protection in a vessel, wherein the composition of the mineral fibers of the insulating element amounts to an alkali/alkaline-earth mass ratio of <1, wherein the insulating element is comprised of a bead portion in the mineral fibers in an amount<1% of the insulating element as well as by an average geometrical fiber diameter of ≦4 μM, a surface weight of 0.8 through 4.3 kg/m², and wherein a portion of a bonding agent of the insulating element in relation to the mineral fibers is in the range of 0.5 through 4% by weight;
wherein the weight per unit area of the insulating element with a Fire Resistance Category A15 or similar is in the range of about 0.8 to 1.4 kg/m², with a Fire Resistance Category A30 or similar, about 1.2 to 1.8 kg/m², and with a Fire Resistance Category A60 or similar, about 2.0 to 2.5 kg/m²; and
wherein the insulating element, having a gross density of 50 kg/m³ or less, is compressible in a minimum ratio of 2:1.

2. The insulating element according to claim 1, wherein the bonding agent is an organic bonding agent.

3. The insulating element according to claim 1, wherein the portion of the bonding agent, in relation to the mineral fibers of the insulating element, lies within the range of 0.5 to 2% by weight.

4. An insulating element in the form of a plate or roll felt, adapted for the insulation of a vessel's bulkhead, comprising mineral fibers, made of bonded fibers soluble in a physiological agent, wherein the insulating element may be utilized as fire and/or thermal and/or sound protection in a vessel, wherein the composition of the mineral fibers of the insulating element amounts to an alkali/alkaline-earth mass ratio of <1, wherein the insulating element is comprised of a bead portion in the mineral fibers in an amount<1% of the insulating element as well as by an average geometrical fiber diameter of <4 μm, a surface weight of 0.8 through 4.3 kg/m², and wherein a portion of a bonding agent of the insulating element in relation to the mineral fibers is in the range of 0.5 through 4% by weight;
wherein the insulating element features an λ-value of ≦35 mW/mK;
wherein the weight per unit area of the insulating element with a Fire Resistance Category A15 or similar is in the range of about from 0.8 to 1.4 kg/m², with a Fire Resistance Category A30 or similar, from 2.3 to 3.0 kg/m², and with a Fire Resistance Category A60 or similar, from 3.2 to 4.3 kg/m³; and
wherein the insulating element, having a gross density up to 50 kg/m³, is compressible in a minimum ratio of 2:1, and wherein the insulating element, having a gross density up to 30 kg/m³, is compressible in a minimum ratio of 3:1.

5. The insulating element according to claim 1, wherein the insulating element features an λ-value of ≦35 mW/mK.

6. The insulating element according to claim 1 wherein the insulating element is in the form of roll felt, wherein the composition of the mineral fiber of the insulating element amounts to an alkali/alkaline-earth mass ratio of <1, wherein the fiber structure of the insulating element is determined by an average geometrical fiber diameter of ≦4 μm and the roll felt is substantially in the form of a stepped wire mat, whose utilization temperature is >500° C. with gross densities between 45 and 75 kg/m³, and wherein the bonding agent content is about <2 weight %.

7. The insulating element according to claim 1, wherein the mineral fibers of the insulating element are manufactured by internal centrifugation in a centrifuge basket procedure, wherein the temperature at the centrifugation basket is at least 1,100° C.

8. The insulating element according claim 1, wherein the insulating element is operatively associated with a vessel's frames.

9. The insulating element according to claim 8, wherein the insulating element further comprises at least one lamination, selected from one of an aluminum foil or a glass cloth fleece, being applied in such a manner around the frames of a vessel such that it encloses the insulating element and the at least one lamination in one processing step exempt of a thermal bridge.

10. The insulating element according to claim 1, wherein the mineral fibers of the insulating element correspond, regarding their solubility in a physiological agent, to at least one of the requirements of the European guideline 97/69/EG and the requirements of the German dangerous material regulation exp. IV NR. 22.

11. The insulating element according to claim 10, wherein the ranges of the chemical composition of the mineral fibers are as follows:

| | |
|---|---|
| $SiO_2$ | 39-52% |
| $Al_2O_3$ | 16-26% |
| CaO | 8-18% |
| MgO | 1-4.9% |
| $Na_2O$ | 2-12% |
| $K_2O$ | 2-12% |
| $R_2O$ ($Na_2O + K_2O$) | 10-13.5% |
| $P_2O_5$ | 0-2% |
| $Fe_2O_3$ (iron total) | 3.2-8% |
| $B_2O_3$ | 0-1% |
| $TiO_2$ | 0.4–1%. |

* * * * *